April 28, 1953  J. R. OISHEI  2,636,206
WINDSHIELD WIPER AND DEFROSTER POWER SUPPLY
Filed Nov. 20, 1948
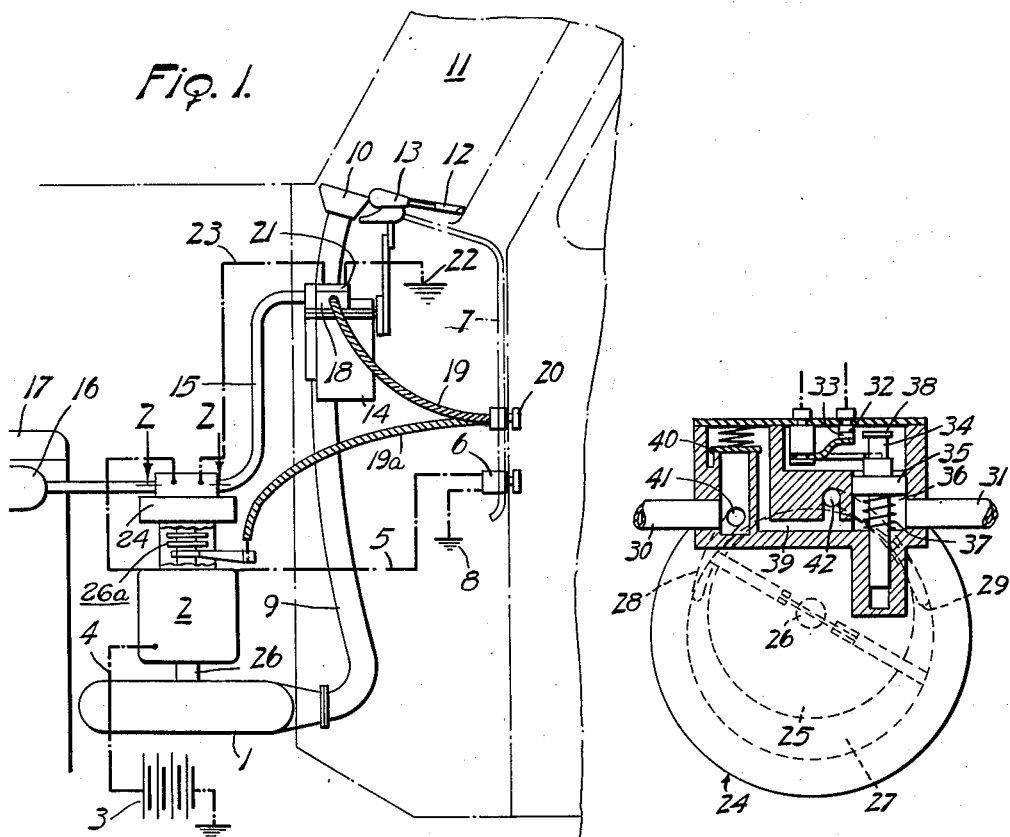
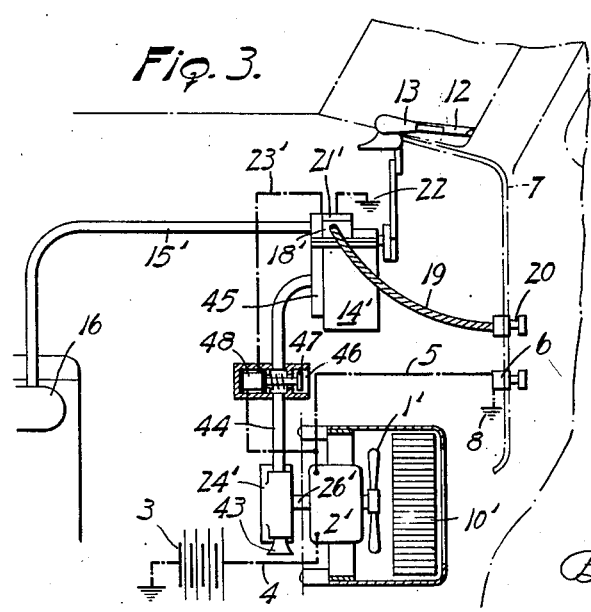
INVENTOR
John R. Olshei
BY
Bean, Brooks, Buckley & Bean.
ATTORNEYS Patented Apr. 28, 1953

2,636,206

UNITED STATES PATENT OFFICE 2,636,206

WINDSHIELD WIPER AND DEFROSTER POWER SUPPLY

John R. Oishei, Buffalo, N. Y.

Application November 20, 1948, Serial No. 61,234

5 Claims. (Cl. 15—253)

1

This invention relates to a motor vehicle and more particularly to the accessory system thereof.

The windshield cleaner of the present day vehicle has long been connected to the intake manifold of the vehicle power plant for actuation thereby, but due to the fluctuating characteristic of the source of suction, frequent attempts have been made to provide a satisfactory supplementing source to provide uniform and reliable cleaner performance.

The primary object of the present invention is to provide a novel pressure source for the actuation of the windshield cleaner independently of or in conjunction with the intake manifold.

A further object of the invention is to provide a simplified arrangement or combination with a passenger accessory unit which will insure a practical supply of fluid pressure for the efficient operation of the windshield cleaner at all times whenever a demand is made for its functioning.

The foregoing and other objects will manifest themselves as the following description progresses, reference being had therein to the accompanying drawing, wherein Fig. 1 is a schematic view showing the application of the present invention on a motor vehicle;

Fig. 2 is a transverse sectional view about on line 2—2 of Fig. 1; and

Fig. 3 is a view similar to Fig. 1 showing a modified form of the invention.

Referring more particularly to the drawing, the numeral 1 designates a centrifugal blower of a defroster unit which is operable by an electric motor 2 and electrically connected into circuit with the source of energy 3 by wires 4 and 5, the latter leading to a control switch 6 on an instrument panel 7 and grounded at 8. By closing the electric circuit the motor 2 will operate the blower 1 to discharge a blast of air through a hose 9 to a distributing nozzle 10 at the lower inner side of the windshield 11.

Arranged on the outside of the windshield is a wiper 12 designed to be oscillated by an arm 13, which in turn is operatively connected to a suction operated motor 14, the latter being connected by a suction line 15 to the intake manifold 16 of the motor vehicle power plant 17. The control valve 18 of the windshield cleaner motor is designed to be actuated by a flexible connector 19 leading to the control knob 20 on the instrument board. This control 19, 20 also is utilized for opening and closing a switch 21 associated with the valve 18, the switch being grounded at 22 and connected by a circuit wire 23 through

2 the motor 2 to the battery 3 for energizing the motor to drive a suction pump 24 when necessary for the operation of the windshield cleaner. The control valve 18 and switch 21 may be of any suitable construction such as that shown in copending application Serial No. 733,274, now Patent 2,520,650, August 29, 1950. Ordinarily the manifold suction influence will be ample to operate the cleaner, but in view of the fluctuating character of this source of suction, it is desired to cause the pump to function in a supplementary capacity, or at other times, as when the engine has stopped, to function as the sole source of suction for the cleaner motor.

To this end, and in accordance with the present invention, the pump is operable from the blower motor 2. This simplifies and enables a compact installation. The pump, herein illustrated as of the rotary type, has its bladed rotor 25 fixed to the armature shaft 26 of the electric motor 2. The motor is eccentrically disposed within the pump chamber 27, the latter having an inlet port 28 and an outlet port 29 connected respectively to the windshield cleaner motor 14 and to the intake manifold 16 by conduits 30 and 31. If desired a clutch 26a may be interposed in the shaft 26 between the motor 2 and the pump 24 to disconnect the pump from the motor. This clutch may be conveniently controlled by the windshield cleaner control knob 20 through a flexible connector 19a to be closed during operation of the windshield cleaner.

In view of the fact that the windshield cleaner is operable for long periods primarily by the manifold suction influence alone, it is apparent that the operation of the suction pump 24 is not required during such intervals. Therefore, means are provided to automatically cut in and out the functioning of the motor during such intervals of ample manifold supply, this automatic arrangement being shown in the enlarged section of Fig. 2 and comprising a fixed contact 32 and a movable contact 33, the latter being connected by a play connection 34 to a pressure responsive member or plunger 35 slidable within a chamber 36 into which the manifold connected conduit 31 opens. A spring 37 urges the plunger upwardly into a switch closing position, as shown. When the manifold suction influence is of a predetermined degree, sufficient to operate the windshield cleaner in a practical manner, the suction will depress the plunger 35 to cause the shoulder 38 on the plunger stem to separate the contact 33 from the fixed contact and thereby render the electric motor inoperative. The conduits 30 and 31 of the suction line are directly connected by a shunt passage 39 which includes a spring seated check valve 40 opening toward the manifold. The inlet and outlet ports 28 and 29 open from the pump into this shunt passage through the openings 41 and 42, respectively, the check valve being interposed between such openings.

Should the manifold suction be deficient, then the plunger will reestablish the circuit through the contacts 32, 33 under the urge of the spring 37 to energize the electric motor. When the vehicle is parked and the engine arrested, the closing of the switch 21 concurrently with the opening of the valve 18 will energize the motor driven pump to provide suction for cleaner operation.

In the modification of Fig. 3 the air flow unit within the passenger compartment of the vehicle is depicted as a car heater and has a radiator 10' through which air is circulated by a fan 1' which for ease of description may be referred to as a blower. This fan or blower is driven by an electric motor 2', the motor being electrically connected to the battery 3 by a wire 4 and to a control switch 6 by a circuit wire 5. The windshield cleaner motor 14' is likewise fluid actuated and operatively connected to the wiper actuating arm 13 in a manner for oscillating the wiper 12. The suction line 15' connects the manifold 16 to the fluid motor through a control valve 18', the latter being actuated from the control knob 20 on the instrument panel.

In lieu of having the fluid motor actuated by the pressure differential between the manifold suction influence and the outside atmosphere, the latter pressure is replaced by a superatmospheric one as developed by the air pump 24'. This air pump may be similar in construction to the air pump 24 so that its rotor will be driven by the shaft 26' of the armature of the motor 2'. The air inlet for the pump will be provided with an air filter 43 and the discharge from the pump will be carried by a conduit 44 to the air tight automatic valve chamber 45. The switch 21' will be connected in circuit with the battery 3 and the electric motor 2' by the wire 23' so that whenever the control knob 20 is actuated the pump will be energized to supply the windshield cleaner motor with a superatmospheric pressure sufficient in itself to actuate the fluid motor when the engine is at rest, or to cooperate with the manifold suction influence whenever the engine is in operation.

In either form of the invention the electric motor of the passenger compartment accessory is utilized in a dual capacity for providing air flow for the actuation of the fluid motor of the windshield cleaner. The rotor or fan element of the blower 1 is fixed to rotate with the rotor 25 of the air pump 24. Likewise, the rotor or fan 1' of the heater is fixed on the armature shaft of the electric motor to rotate with the bladed rotor 25 of the air pump or compressor 24'. This plural rotor unit will rotate whenever the inside accessory is called upon by the control 6. It will operate at other times when the windshield cleaner is actuated during intervals in which the manifold influence is deficient or wholly lacking. Such intervals, however, are not too often and are in duration for a relatively shorter time as compared to the operating period of the passenger compartment accessory unit.

If desired, the compressor 24' may discharge directly to the atmosphere through a vent 46 when the windshield cleaner is inoperative. This vent may be closed by a valve 47 seated by an electro-magnet 48, which in turn is interposed in the electric circuit connection 23'.

The windshield cleaner unit and the inside or passenger compartment unit have a common source of power for producing dual air streams, one within and one without the windshield, the air flow from the car heater, like the air flow from the defroster, serving to circulate air within the passenger compartment and thereby remove vision obscuring matter and condensation from the inner surface of the windshield, while the other air stream sets in motion a mechanism for removing vision obscuring matter from the outer surface. The common source of motive power simplifies and facilitates the installation of the accessories and further reduces the wear and tear on the storage battery 3.

The armature of the electric motor together with the rotors fixed on the opposite ends of the armature shaft constitutes a fixed unit and operates at all times as such whenever the electric motor is called into use. Clutch means may be provided to disconnect either or both of the rotors from the armature whereby the electric motor may function to drive each rotor independently of the other.

The foregoing description has been given in detail without thought of limitation since the inventive principles involved are capable of assuming other physical embodiments without departing from the spirit of the invention and the scope of the appended claims.

What is claimed is:

1. In a motor vehicle having a windshield, a windshield cleaner unit for removing vision obscuring matter from the exterior surface thereof and operable by a fluid pressure motor, a passenger compartment accessory unit arranged for conducting airflow in the passenger compartment of the vehicle, said accessory unit having a blower and an electric motor driving the same, a pump connected to the cleaner unit for supplying an operating pressure differential therefor, means operatively connecting the pump to the electric motor of the accessory unit to be driven thereby as a source of power common to both units, and control means for each unit each operable independently of the other and acting to energize the electric motor.

2. In a motor vehicle, a vehicle accessory unit operable by a fluid pressure motor, a passenger compartment accessory unit arranged for conducting airflow in the passenger compartment of the vehicle, said passenger compartment accessory unit having a blower and an electric motor driving the same, a pump connected to said vehicle accessory unit for supplying an operating pressure differential therefor, clutch means selectively connecting the pump to the electric motor of said passenger compartment accessory unit to be driven thereby as a source of power common to both units, and control means for each unit each operable independently of the other and acting to energize the electric motor.

3. In a motor vehicle having a windshield, a windshield cleaner unit for removing vision obscuring matter from the exterior surface thereof and operable by a fluid pressure motor, a source of fluctuating pressure connected to the fluid motor for operating the same, a passenger compartment accessory unit arranged for effecting airflow in the interior of the vehicle so as to act on the interior surface of said windshield and aid in removing vision-obscuring material from said windshield, said accessory unit having a blower and an electric motor driving the same, a pump connected to the cleaner unit for supplying an operating pressure differential therefor, means operatively connecting the pump to the electric motor of the accessory unit to be driven thereby as a source of power common to both units, and control means for each unit each operable independently of the other and acting to energize the electric motor, said control means for the cleaner unit being responsive to the pressure of said fluctuating source for rendering the electric motor operative for windshield cleaner operation during intervals when the fluctuating pressure is insufficient for cleaner operation.

4. In a windshield clearing system, a motor, blower means operatively connected to said motor for moving a stream of air against the windshield by the power of the motor to remove moisture deposited on the inner side of the windshield, a windshield cleaner unit, pump means operatively connected to the motor and to the windshield cleaner unit for independently and simultaneously moving a second stream of fluid to supply an operating pressure differential for the windshield cleaner unit, and control means for the cleaner unit and for the blower each operable independently of the other and acting to energize the electric motor whereby either stream of fluid may be moved by the power of the motor as a source of power common to both.

5. In a motor vehicle, a fluid pressure motor, a passenger compartment accessory unit arranged for conducting airflow in the passenger compartment of the vehicle, said accessory unit having a blower and an electric motor driving the same, a pump connected to the pressure motor for supplying an operating pressure differential therefor, means operatively connecting the pump to the electric motor of the accessory unit to be driven thereby as a source of power common to both the pressure motor and the accessory unit, and control means for the pressure motor and the accessory unit each operable independently of the other and acting to energize the electric motor.

JOHN R. OISHEI.

References Cited in the file of this patent

UNITED STATES PATENTS

| Number | Name | Date |
| --- | --- | --- |
| 1,613,034 | Janette | Jan. 4, 1927 |
| 1,907,032 | Askin | May 2, 1933 |
| 2,002,318 | Hueber | May 21, 1935 |
| 2,021,857 | Hueber | Nov. 19, 1935 |
| 2,059,457 | Horton | Nov. 3, 1936 |
| 2,164,854 | Booth | July 4, 1939 |
| 2,165,181 | Horton | July 4, 1939 |
| 2,188,388 | Butterfield | Jan. 30, 1940 |
| 2,323,470 | Horton | July 6, 1943 |
| 2,465,554 | Roy | Mar. 29, 1949 |